(No Model.) 2 Sheets—Sheet 1.

J. G. HEYWOOD.
APPARATUS FOR TREATING SEWAGE.

No. 392,605. Patented Nov. 13, 1888.

Witnesses.
John G. Heywood Inventor.
By Chas. H. Burleigh
Attorney.

(No Model.) 2 Sheets—Sheet 2.

J. G. HEYWOOD.
APPARATUS FOR TREATING SEWAGE.

No. 392,605. Patented Nov. 13, 1888.

Witnesses.
S. R. Barton.
Charles L. Bacon.

Inventor.
John G. Heywood,
By Chas. H. Burleigh,
Attorney.

United States Patent Office.

JOHN G. HEYWOOD, OF WORCESTER, MASSACHUSETTS.

APPARATUS FOR TREATING SEWAGE.

SPECIFICATION forming part of Letters Patent No. 392,605, dated November 13, 1888.

Application filed January 16, 1888. Serial No. 260,945. (No model.)

*To all whom it may concern:*

Be it known that I, JOHN G. HEYWOOD, a citizen of the United States, residing at Worcester, in the county of Worcester and State of Massachusetts, have invented certain new and useful Improvements in Apparatus for Treating Sewage, of which the following, together with the accompanying drawings, is a specification sufficiently full, clear, and exact to enable persons skilled in the art to which this invention appertains to make and use the same.

The object of my present invention is to provide apparatus for the purifying of the sewage by a system of forced filtration, in which the liquid is drawn by exhaust pressure or suction through a submerged traveling filter, and the semi-liquid sludge which is delivered therefrom subsequently condensed by subjection to exhaustive action; also, to afford facilities for the further treatment of the liquid, when desired, by slow filtration and by means of a system of filters, the contents of which can be conveniently dumped and renewed.

The nature and arrangement of apparatus for the practice of my invention are explained by the drawings and following description, the particular subject-matter claimed being hereinafter definitely specified.

Figure 1:
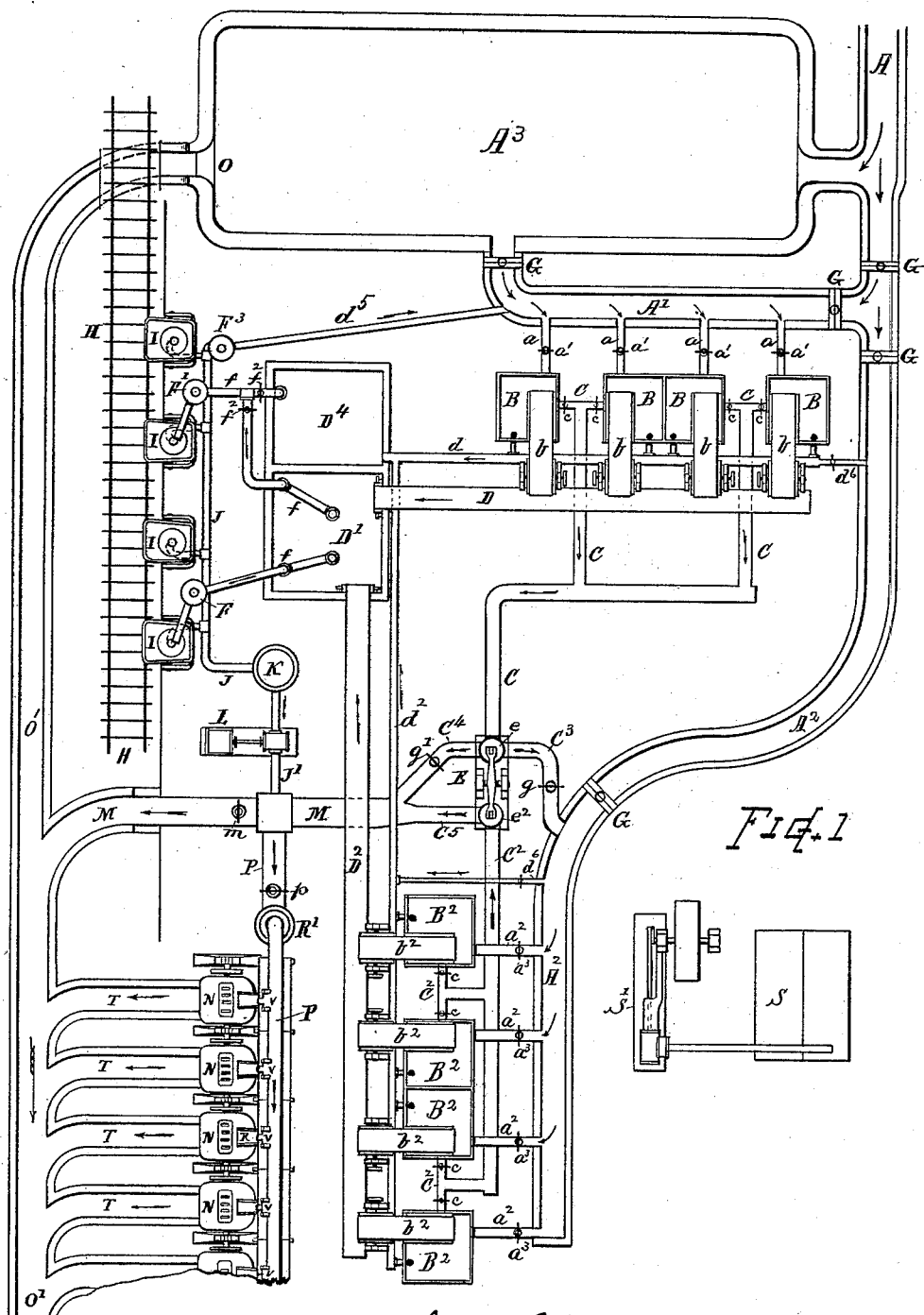
Figure 2:
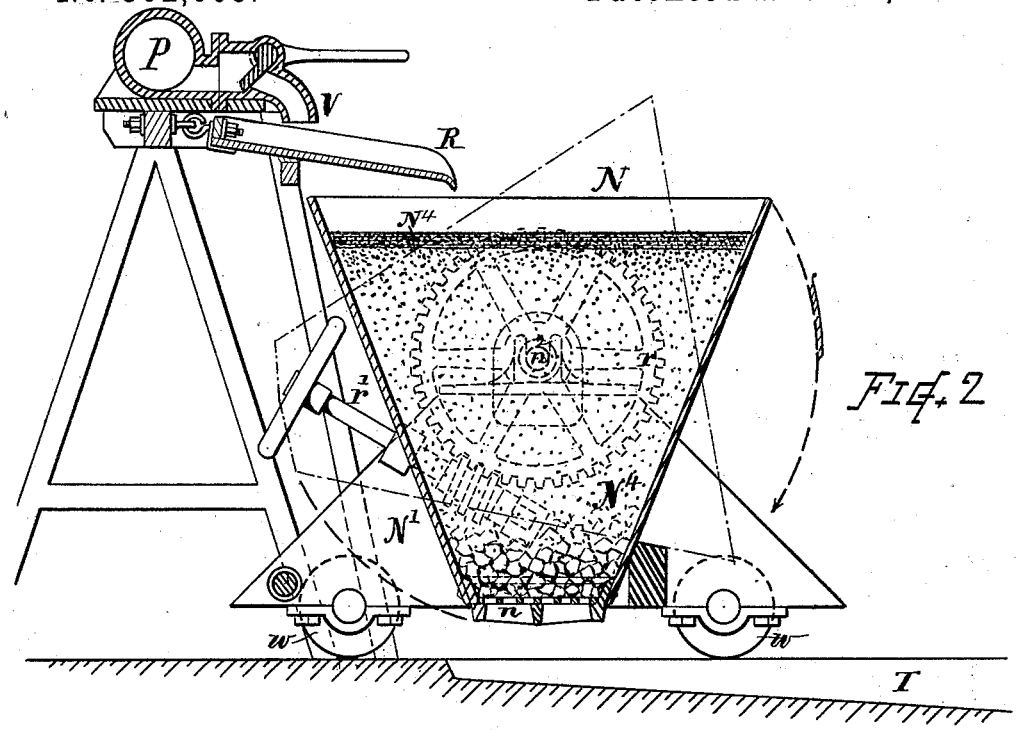
Figure 3:
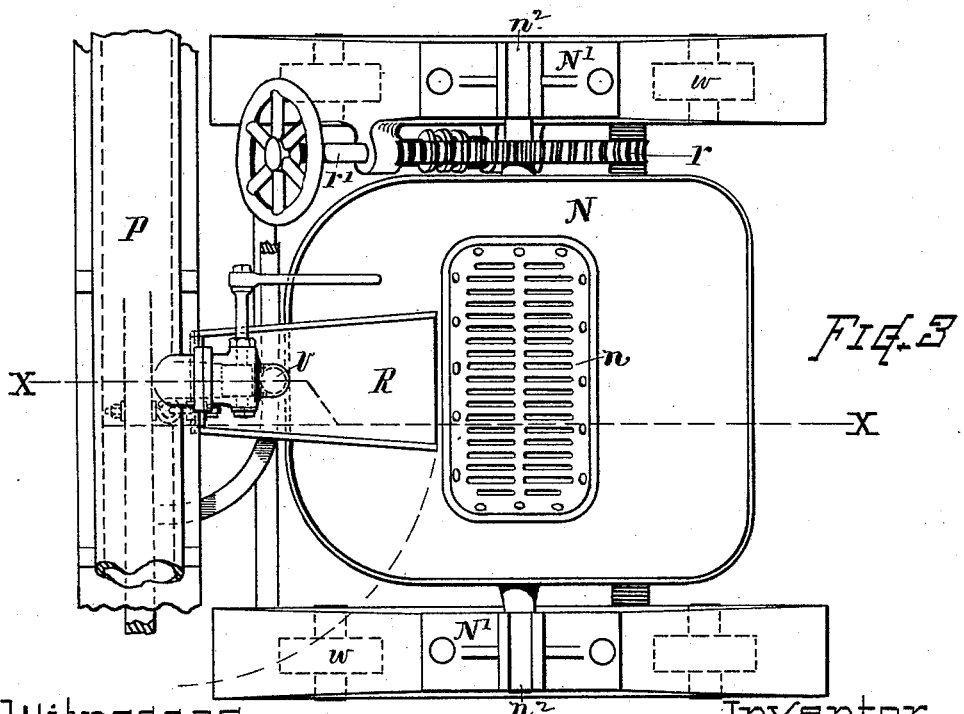

In the drawings, Figure 1 is a diagram plan showing the arrangement of my improved plant for purifying sewage. Fig. 2 is a vertical section, and Fig. 3 is a plan view, of one of my dumping-filters.

Referring to parts, A indicates the main or channel by which the sewage is supplied.

A' and A² are auxiliary channels or branches that communicate with the main.

G indicates gates disposed at convenient positions for opening and closing the channels and controlling the flow as desired.

A³ indicates a storage basin or reservoir, one or more of which may be employed, when desirable, to accommodate fluctuations in the quantity of sewage delivered under different conditions. The reservoir has an overflow at O, by which surplus water in time of storms may escape into the tail-race channel o'.

B B B B denote filtering-engines, comprising chambers or tanks, and having endless traveling filter-belts which operate in conjunction with perforated suction-boxes that are connected by the pipes C with an exhauster or pumping-engine, E. The sewage is conducted to the engines B from the channel A' by the pipes a, each of which is furnished with a valve or gate, a', for separately stopping off the filters. The filtration is forced by the exhaust action of the pump E, while the traveling filter-belts b deliver the semi-liquid sludge to a conveyer, D, that carries it into a vat or receptacle, D', from which it is raised for further treatment by means of pumps F F', having suction-pipes f, that lead from the bottom of the vat.

The filter-engines B are each provided with a drainage gate and passage, by which their contents, after the head-gate is closed, can be drawn off through the pipe d into a vat, D⁴, to be pumped back into the head-channel A' through the pipe d⁵, or treated with the sludge.

The special construction of a filtering-engine suitable to be used in the position of those indicated at B, I have made the subject-matter of a separate application for Letters Patent, and do not, therefore, herein illustrate and describe said filtering-engines in all their details of construction.

B² B² B² B² indicate a second series of filtering-engines having traveling filter-belts b², constructed, arranged, and operated in substantially similar manner to the filtering-engines B above described, and connected with the channel A² by pipes a², having stop-gates a³, for supplying the tanks, and having their perforated suction-boxes connected with the pipe C², leading to the pumping-engine E, for effecting forced filtration by exhaust action in said filtering-engines.

D² indicates a conveyer for receiving and conducting the semi-liquid sludge into the vat D', and d² is a drainage-pipe from the filtering-engines B² to the vat D⁴.

The pipes C and C² are provided with gates c, for separately stopping off the filtering-engines B and B².

A pipe, C³, leads from the first section, e, of the pumping-engine E into the auxiliary channel A², whereby the liquid which has been primarily filtered in the engines B can be delivered for a secondary filtration through the filtering-engines B². A pipe, C⁴, also leads from said pumping-engine to the intermediate delivery-conduit, M. The pipes C³ and C⁴ are provided with gates g and g', whereby the flow can be directed either to the auxiliary channel A², or to the intermediate discharge-conduit, M. A pipe, C⁵, also leads from the second section, e², of the pumping-engine E to the intermediate discharge-conduit, M, for conveying the liquid drawn from the system of filtering-engines B².

I I I I indicate a series of sludge-condensers, disposed adjacent to a railway-track, H, on which a car can be run in for receiving the contents of the condensers, which are preferably mounted on trunnions in a manner to be readily overturned for dumping their contents into said car. These condensers are provided with strainers and suction-connections in their bottom part, and are respectively connected by a pipe or pipes, J, with an exhauster or chamber, K, from which air and water can be exhausted by means of a suitable pumping-engine, L, arranged, in the present instance, for delivering the same through the pipe J' into the intermediate discharge-conduit, M.

The sludge-condensers I receive the sludge from the tank D' by way of the pumps F F', the discharge-nozzles of said pumps being arranged so that they can swing around to deliver into either one of the condensers of the respective pairs. Thus when one condenser has been filled the pump can be shifted to the other, and the process of condensing the contents of the first be effected while the other is being filled. The pipes from the vats D' and D⁴, that lead to the pump F', are joined, the branches of the pipe being provided with gates $f^2$, so that said pump F' can be used to draw the contents from either of said vats. A pump, F³, is also connected with the pipe J, by which the liquid exhausted from the sludge-condensers I can be returned from the pipe J through the pipe $d^5$ into the channel A' for refiltration.

The particular construction of a sludge-condenser adapted for use for the purpose herein described I have made the subject-matter of my claims in a separate application for Letters Patent, Serial No. 260,947, filed on even date herewith.

The sewage can be discharged at the intermediate conduit, M, if desired, or be carried through a further system of filtration through filtering apparatus N, constructed and arranged in the manner illustrated in Figs. 2 and 3. The filters N consist of downwardly-tapered tanks having gratings $n$ in their bottom, and mounted on trunnions $n^2$ upon a supporting-frame, N', in such manner that they can be overturned or tipped down for dumping the contents thereof, a gear, $r$, and worm-shaft, $r'$, being connected with the receptacle at one side for effecting the dumping operation. The receptacles are charged with broken brick or stone overlaid with fine coke, sand, pulverized charcoal, or with other suitable fine filtering material, N⁴.

A pipe or conduit, P, leads from the intermediate conduit, M, or direct from the pumps E and L, if preferred, for delivering the liquid to the filters N. Said pipe P is provided with suitable gates or vents, $v$, at proper intervals for controlling the delivery of the desired quantity of liquid to the respective filters N. The liquid from the vents $v$ of the conduit P is allowed to flow onto spreading-troughs R, and from thence onto the surface of the filtering material for percolating through the same and dripping through the grating $n$ at the bottom. These filter-receptacles N may have their supporting-frames mounted on wheels or trucks $w$, so that they can be run forward and their contents dumped into a car on the track H, which track can be extended along the space in front of the system of filters N.

Gates $m$ and $p$ are arranged in the intermediate delivery-conduit, M, and in the conduit P, respectively, for regulating the flow either for discharge into the tail-race at M' or into the filters N, and thence by the channels T into the tail-race channel $o'$.

A pump at R' can be employed for raising the liquid to the level above the filters N; or, when the situation would admit, said filters could be placed in a position that would allow the liquid to flow to them by gravity.

The drainage-pipes $d$ and $d^2$ are preferably connected, as at $d^6$, with the auxiliary channel A², so that when the head-gates G are closed said channel can be drained and cleansed, the contents being drawn into the vat D⁴.

S indicates the steam-boilers, and S' the steam-engine for supplying the motive power for operating the various parts of the works, the connecting steam-pipes, shafting, belts, and pulleys being arranged in any suitable manner for transmitting the power to the filtering-engines B and B², the pumps, and other parts of the apparatus.

In the present illustration I have shown four filtering-engines at B, the same number at B², four sludge-condensers, I, and four final filters, N; but it will be understood that I do not confine my invention to any particular number of filters and condensers, as a greater or less number may be used, according to the requirements of the plant or the quantity of material to be treated.

As the semi-liquid sludge separated from the sewage by the filtering-engines is conveyed or worked by means of pumps, it is desirable that the sewage, before its delivery to the filtering-engines B, should be passed through a screen, which will stop all such material as floating blocks, dead animals, and other substances of a large and solid nature. Such screen can be located at any convenient position in the channel A and be arranged for cleaning in any suitable manner. This screen is not an essential part of my invention, and I have, therefore, not shown it in my present drawings.

The operation of my improved apparatus is as follows: The sewage from the reservoir or channel passes into the filtering-engines B, which, being in operation, separate the liquid from the sludge, the liquid being forcibly drawn through the filters by the exhaust action of the pumping-engine E, and delivered to the conduit M or to the second series of filtering-engines, B², through which it is in like manner drawn, and then delivered to said conduit, while the semi-liquid sludge passes to the sludge-condensers, where its contained moisture is nearly all removed by atmospheric pressure induced by the exhaust devices and pumping-engine L, after which the sludge is dumped to be carted off in earthy form, while the sewage-water, which has been freed from the mass of sludge, is passed through the percolating-filters N. This apparatus is adapted for treating the sewage under the various conditions that exist at different times, as when containing proportionally large quantity of water and little contamination it may be filtered in engines B, and then be discharged in large quantity at the intermediate conduit, M, direct from the pumps at E; or, if less quantity of liquid and proportionally more difficult to cleanse, it can be filtered twice by passage through engines B and B²; or, if the sewage bears a proportionately small quantity of water and much contamination, then it can be passed through both engines B and B², and also through the percolating-filters N. By simply opening and closing the proper gates the adaptation for one condition or another is quickly effected, thus rendering this apparatus very efficient and desirable for practical service.

What I claim as of my invention, and desire to secure by Letters Patent, is—

1. An apparatus for treating sewage, comprising a primary filtering-engine, a secondary filtering-engine, respectively provided with traveling filters that collect and automatically discharge the sludge, and suction-pipes for taking the liquid through said filters, the intermedial and secondary discharge-conduits, as C⁴ and C⁵, and a pumping-engine for exhausting the liquid from said primary filter-engine, provided with pipes or carriages for delivering it either through said secondary filter-engine or into said intermedial discharge-conduit, all the parts named being combined for operating substantially as set forth.

2. In apparatus for treating sewage, the combination of the channels A' A², filtering-engines B and B², supply-pipes $a$ $a^3$, the pumping-engine E, suction-pipes C and C², the delivery-pipes C³ and C⁴, with stop-gates $g$ and $g'$, and the conduits C⁵ and M, substantially as and for the purposes set forth.

3. The apparatus for treating sewage, comprising the filtering-engine B, having the suction-pipe C and a traveling filter, $b$, that passes across the suction-inlet for collecting and automatically discharging the sludge, the sludge-conveyer D, extending beneath the delivery of said filter, for receiving the sludge therefrom, the atmospheric sludge-condensers I, consisting of tanks with pervious separating-plates and exhaust-chambers, and exhausting mechanism for inducing suction-pressure in said filters and condenser, for the purpose set forth.

4. In apparatus for treating sewage, the combination of the atmospheric-pressure sludge-condensers I, connected by a pipe with the exhauster K, a series of overturnable filters, N, for receiving and purifying the water exhausted from said condensers, the connecting-pipes J, J', and P, leading from said condensers to said filters, the exhausting pump or engine for inducing the flow of water therethrough, and gates in connection with pipes P, for delivering to the respective filters, as set forth.

Witness my hand this 7th day of January, A. D. 1888.

JOHN G. HEYWOOD.

Witnesses:
CHAS. H. BURLEIGH,
ELLA P. BLENUS.